United States Patent [19]

Hirumi

[11] Patent Number: 5,008,837
[45] Date of Patent: Apr. 16, 1991

[54] GRAY SCALE GENERATING CIRCUIT FOR THERMAL PRINTER

[75] Inventor: Yasushi Hirumi, Tokyo, Japan

[73] Assignee: Sony Corporation, Tokyo, Japan

[21] Appl. No.: 451,148

[22] Filed: Dec. 15, 1989

[30] Foreign Application Priority Data

Jan. 10, 1989 [JP] Japan ................................ 1-001983

[51] Int. Cl.$^5$ ............................................. G06K 15/00
[52] U.S. Cl. ................................. 364/519; 346/76 PH; 346/154
[58] Field of Search ................... 364/518–520, 364/235 MS File, 930 MS File; 346/76 PH, 154; 358/296, 298; 400/120; 218/216

[56] References Cited

U.S. PATENT DOCUMENTS

| 4,399,749 | 8/1983 | Arai | 400/120 |
| 4,536,771 | 8/1985 | Tanaka | 346/7 PH |

FOREIGN PATENT DOCUMENTS 58-31781A 2/1983 Japan ................................ 346/76 PH Primary Examiner—Arthur G. Evans
Attorney, Agent, or Firm—Ronald P. Kananen

[57] ABSTRACT

A signal generating circuit for generating gray scale signals for a thermal printer with a thermal head comprising a plurality of heating elements arrayed in a line, in such a manner that, even when white-level image data of a minimum or zero density is outputted, printing data adequate for slightly coloring a thermosensitive paper are obtained to prevent the occurrence of deterioration in the vicinity of the white label. The signal generating circuit includes a memory for storing image data to be printed, a PWM pulse driver for generating PWM driving pulses of the image data stored in the memory means, a zero-level pulse driver for generating a zero-level driving pulse, and a circuit for supplying the PWM driving pulses and the zero-level driving pulse to a thermal head drive circuit.

15 Claims, 7 Drawing Sheets

GRAY SCALE GENERATING CIRCUIT FOR THERMAL PRINTER

BACKGROUND OF THE INVENTION

1. Field of the Invention

The present invention relates to a gray scale signal generating circuit for a thermal printer useful when printing a gray scale image on a colorable thermosensitive paper by supplying a printing signal to a thermal head equipped with a plurality of heating elements. More particularly, this invention relates to a circuit for providing a printing signal to a thermal head even for white level signal intensity. Still more particularly, this invention relates to a circuit which provides a printing drive pulse even if the gray scale intensity is zero.

2. Description of the Prior Art

FIG. 4 is a schematic block diagram of a conventional gray scale signal generating circuit for supplying image data to a thermal printer to print a gray scale image on thermosensitive paper. Input analog image signals are supplied to an input terminal 1 and are digitized by an analog-to-digital (A/D) converter 2 to produce digital image data. The digital image data thus obtained is stored in a field memory 3. The circuit further comprises a line memory 4 where the image data of one line outputted from the digital image data in the field memory 3 is stored and read out. A magnitude comparator 5 sequentially compares the output image data $P_D$ of the line memory 4 with reference gray scale data $Q_D$ and outputs the result of each comparison in the form of a "1" or a "0". A memory (ROM) 6 stores reference gray scale data which is read out by the use of clock signal from a controller 7. A latch circuit 8 receives data from the line memory 4 when the output image data $P_D$ is greater than the reference data. A drive circuit 9 receives the output from the latch circuit 8 to provide a signal to a thermal head 10 pressed against a thermosensitive paper 13 and serving to heat the paper in accordance with printing data supplied to the thermal head 10. The thermal head 10 normally includes a plurality of heating elements numerically equal to the image data inputted to the line memory 4. The controller 7 is fed with a timing signal T from an external source.

In such a thermal printer, when image data to be printed is stored first in the field memory 3 via the A/D converter 2, the image data of one line is supplied to the line memory 4 by a read control signal $S_R$ generated from the controller 7 in accordance with the timing signal T, and the image data $P_D$ in the line memory 4 are compared sequentially with the reference gray scale data $Q_D$ outputted from the gray scale memory 6.

With respect to the reference gray scale data, as shown in FIG. 5 for example, data $Q_{DO}$ ($Q_D = 0$) are outputted at an instant to and then image data stored in a line memory 4 is sequentially checked or compared. Thereafter, the signal level is raised stepwise with the lapse of time t as shown by the curve in FIG. 5. Such reference data at the individual levels is compared with the incoming image data $P_D$ of one line outputted from the line memory 4. The results of the individual comparisons are held sequentially in the latch circuit 8.

Data is thus obtained at a high (H) level during the period where $Q_{DO}$ (O) $< P_D \leq Q_{DY}$. Therefore, when the image data has a level $P_{D1}$ as shown in FIG. 5, $Q_D = P_{D1}$ at an instant t1, so that printing data SD1 is turned to a low (L) level at the instant $t_1$ is outputted from latch circuit 8.

Similarly, when image data $P_{D2}$ is obtained, $Q_D = P_{D2}$ at an instant $t_2$ as shown, so that printing data $S_{D2}$ is turned to a low level at the instant $t_2$ is outputted from the latch circuit 8.

In this manner, the n printing data $S_{D1}$ - SDn processed through pulse width modulation (PWM) in conformity with the magnitude of the n image data $P_{D1}$ - $P_{Dn}$ introduced into the line memory 4 is obtained on the basis of the comparison results from the magnitude comparator 5. The printing data is supplied via the latch circuit 8 to the drive circuit 9 which consists of a switching circuit.

The drive circuit 9 causes a flow of printing currents of different pulse widths in the individual heating elements of the thermal head in accordance with the printing data $S_{D1}$ - $S_{Dn}$, so that the heating time is rendered longer for the image data of a higher density. The thermosensitive paper temperature is raised in a monochrome printer to consequently form a blacker color. For the image data of a lower density, the heating time is rendered shorter to induce gray printing.

Therefore, a gray scale image can be printed when such printing operation is performed over the entire image area of one field while feeding the thermosensitive paper. The modulation system based on the above-described technique is disclosed in U.S. Pat. No. 4,399,749 filed previously by the present applicant. That patent is herein incorporated by reference for the sake of disclosure.

In the thermal printer mentioned, as shown in FIG. 6 (a), the lightest portion is set to the white level $D_{min}$ of the printing paper while the darkest portion is set to the maximum coloring level $D_{max}$ of the paper so that the density dynamic range $D_{max} - D_{min}$ can be widened relative to the gray scale signal N.

The relationship between the density D of the thermosensitive paper and the heating energy E, as shown in FIG. 6(b) generally has such an inclination that the rise is extremely unsatisfactory in the low density region, as shown especially in the circle in the lower left portion of the figure. In contrast, a saturation is induced in the high density region near $D_{max}$.

Since the density-to-heating energy curve is changed with the ambient temperature fluctuation and the heat storage state of the thermal head as represented by a one-dot chain line, the printing data supplied to the thermal head need to be controlled so that the density of the print image is not varied by the ambient temperature fluctuation. However, as shown in an enlarged graphic representation of FIG. 6 (c), the sensitivity characteristic is such that, in the vicinity of the region where density becomes zero, this indicating a white level, the curve B is changed remarkably by the harmful influence of the temperature fluctuation. There occurs a steep rise as indicated by a curve A or a sharp rise immediately after the white non-sensible region as indicated by a curve C.

When the density curve varies in the intermediate step of the gray scale, substantially no image deterioration occurs that brings about a problem in the printing area. However, once a great density difference is caused in the gray scale 1 or 0 where the density is zero, a false contour appears in the printing area.

In the case of the curve C, for example, the densities at the gray scales 0, 1 and 2 become the same. Thus, there exists a problem that the quality of the printed image is extremely deteriorated at these low densities.

OBJECT AND SUMMARY OF THE INVENTION

It is therefore an object of the present invention to provide an improved circuit for generating gray scale signals for a thermal printer in such a manner that, even when white-level image data of a minimum or zero density is outputted, printing data adequate for slightly coloring a thermosensitive paper can be obtained to prevent deterioration in the vicinity of the white level.

Relative to a thermal printer where a gray scale image can be printed with supply of signals from an original image to a thermal head comprising a plurality of heating elements arrayed in a line, a main feature of the present invention resides in that a signal for slightly coloring the thermosensitive paper is supplied to the thermal head even when there is outputted a printing signal corresponding to the white level density of the original image. Thus, the deterioration of the image quality derived from incomplete reproduction of the white portion that is prone to occur in printing any gray scale image is minimized.

In the present invention, the density-to-heating energy characteristic curve for the thermal printer is so determined as to cause slight coloring even when the gray scale signal is 0, i.e. in the white-level portion where the density is zero. Therefore, although the density dynamic range is somewhat narrowed, it becomes possible to prevent the deterioration liable to be induced in the vicinity of the white level of the printed image, thereby maintaining a desired high quality of the image.

According to one aspect of the present invention, there is provided a gray scale signal generating circuit which comprises a memory means for storing image data to be printed, means for generating PWM driving pulses of the image data stored in the memory means, means for generating a zero level driving pulse, and means for supplying the PWM driving pulses and the zero level driving pulse to a thermal head drive circuit.

These and other features of the invention will become apparent from a review of the detailed description of the invention which follows taken in conjunction with the drawings.

DESCRIPTION OF THE PREFERRED EMBODIMENT

Figure 1:
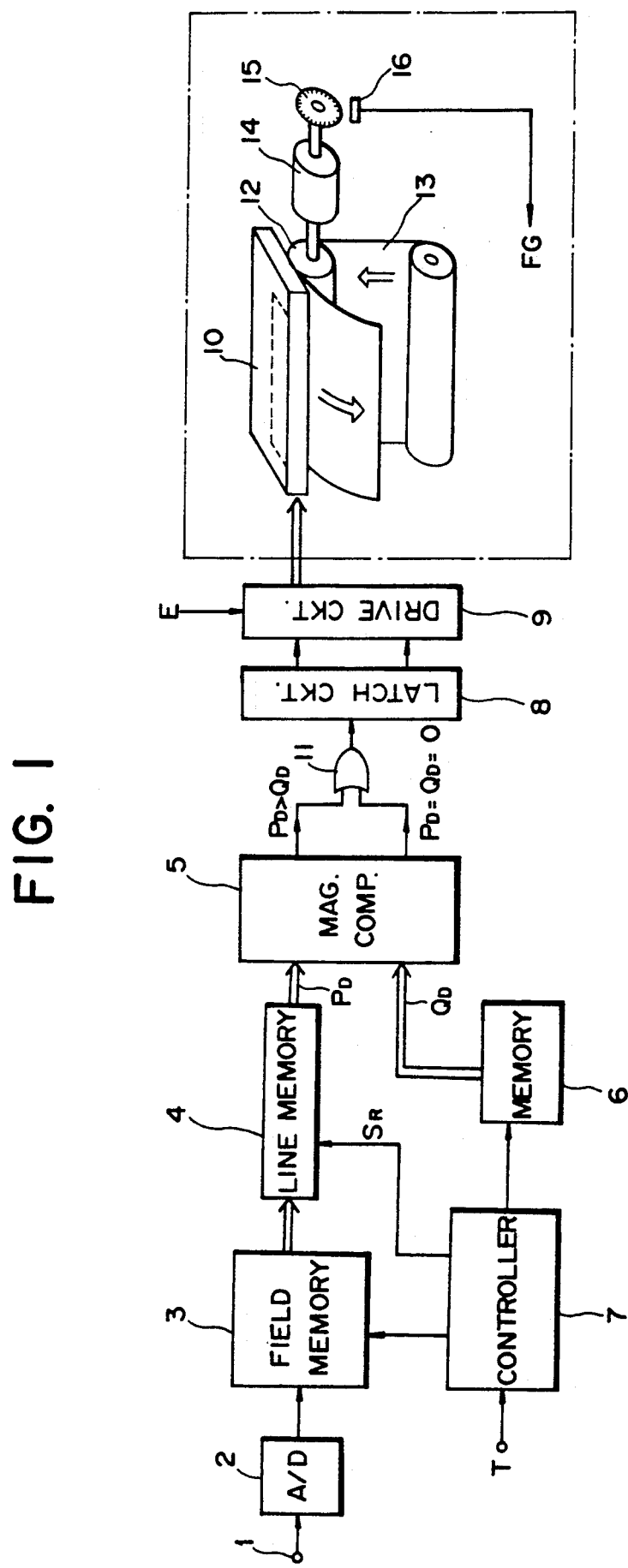
FIG. 1 is a block diagram of an exemplary gray scale signal generating circuit for a thermal printer embodying the present invention.
Figure 4:
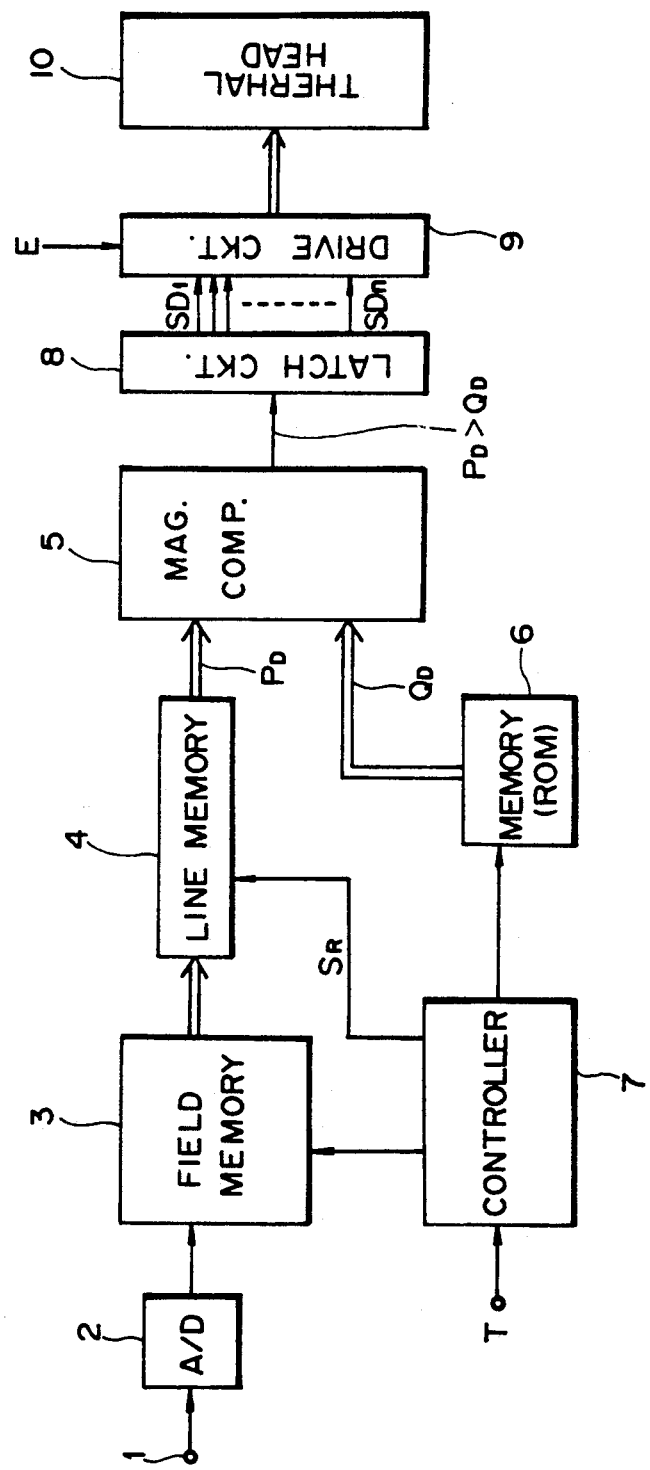
FIG. 4 is a block diagram showing the principle of operation of a general thermal printer.

FIG. 1 is a block diagram of an exemplary circuit configuration embodying the present invention. The same components as those shown in FIG. 4 are denoted by the same reference numerals and symbols for simplicity in this description.

A magnitude comparator 5 serves to compare the image data $P_D$, which are outputted from a line memory 4, with reference gray scale data $Q_D$ obtained from a gray scale memory 6. In the present invention, the magnitude comparator 5 is so arranged as to produce an output signal at a high level "1" via an OR gate 11 even when $P_D = Q_{D0} = O$, i.e., when the image data is equal to the gray scale reference data and both are equal to zero as is shown, the OR gate 11 also produces a high level output signal when the image data $P_D$ is greater then the reference gray scale data $Q_D$.

A platen 12, a roll of thermosensitive paper 13, a paper feed motor 14, a rotary encoder 15, and an FG element 16 are shown forming a representative printer which receives the output of the OR gate 11 through a latah circuit 8 and a drive circuit 9.

Figure 5:
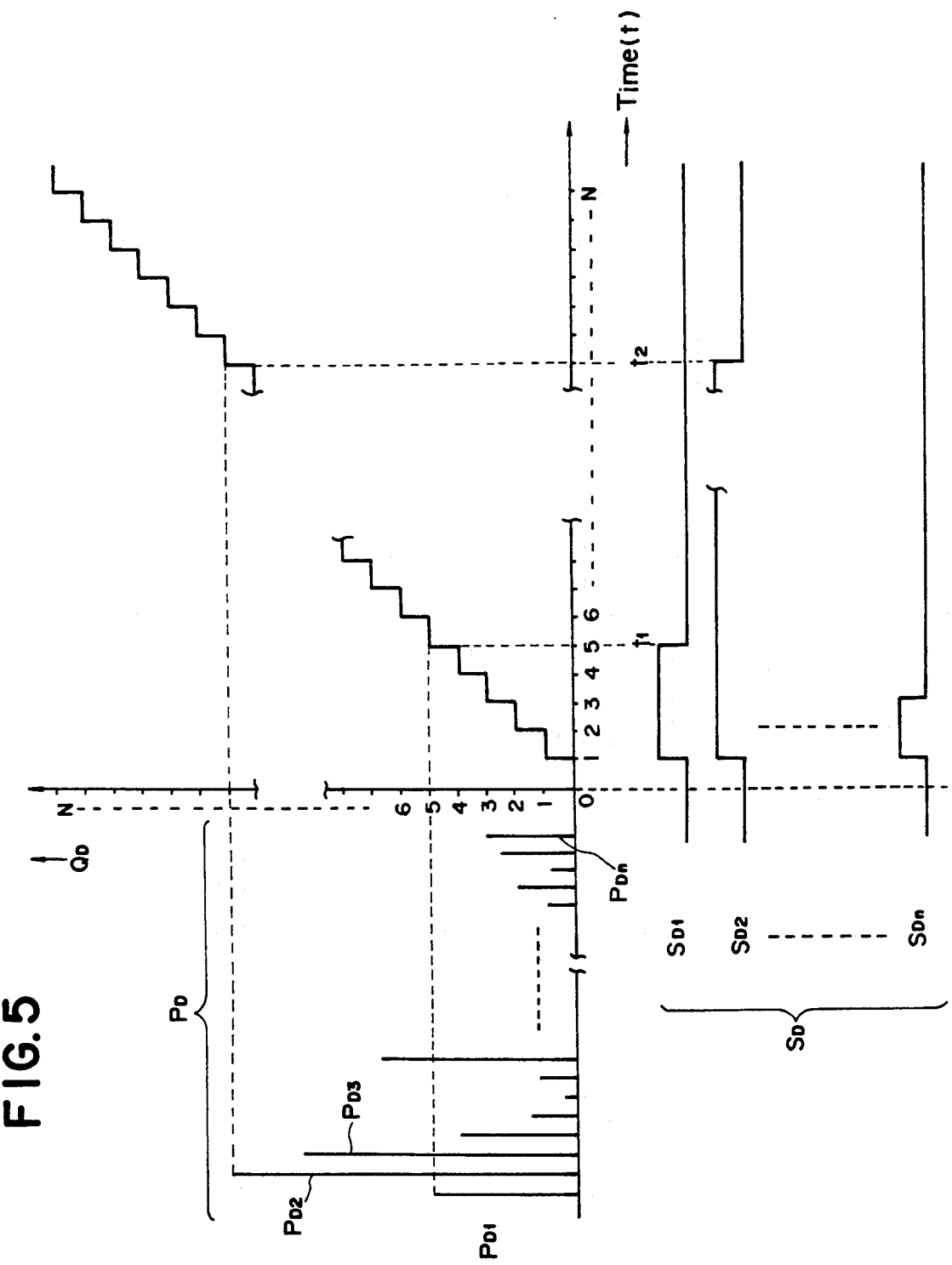
FIG. 5 graphically represents the relationship between gray scale data and printing data.
Figure 6A:
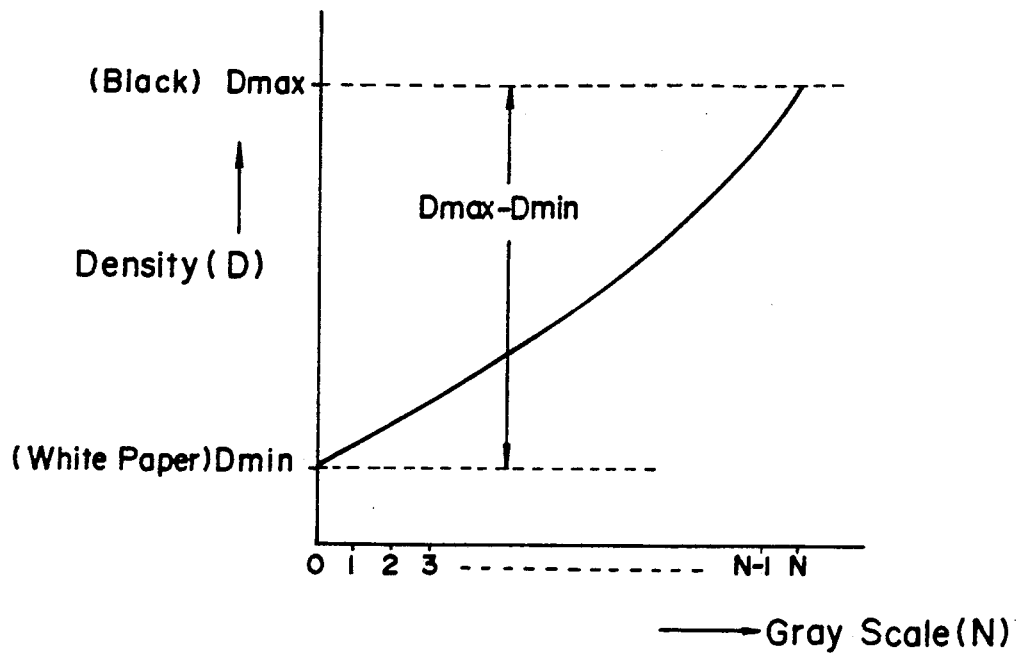
FIGS. 6(a), 6(b) and 6(c) graphically represent the coloring characteristics and the relationship between the density and the gray scale.
Figure 6B:
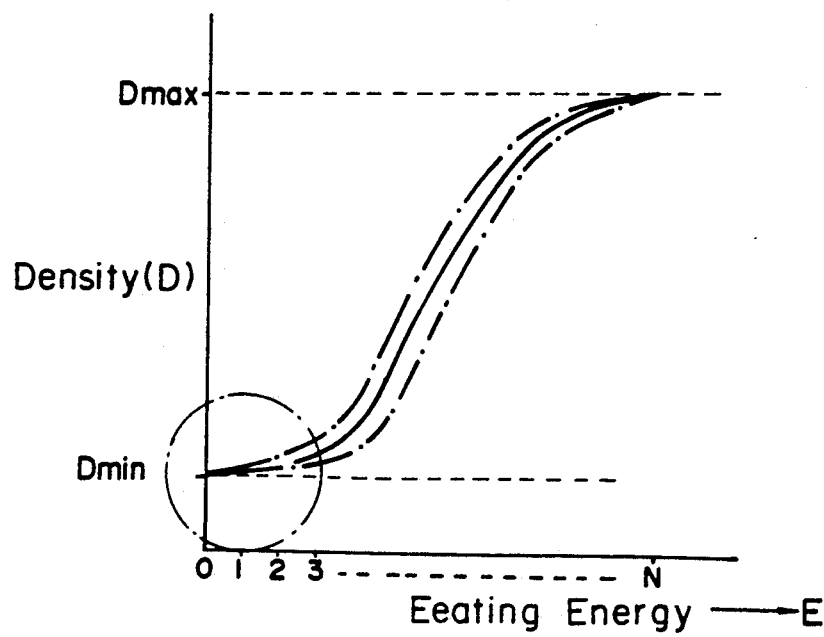
Figure 6C:
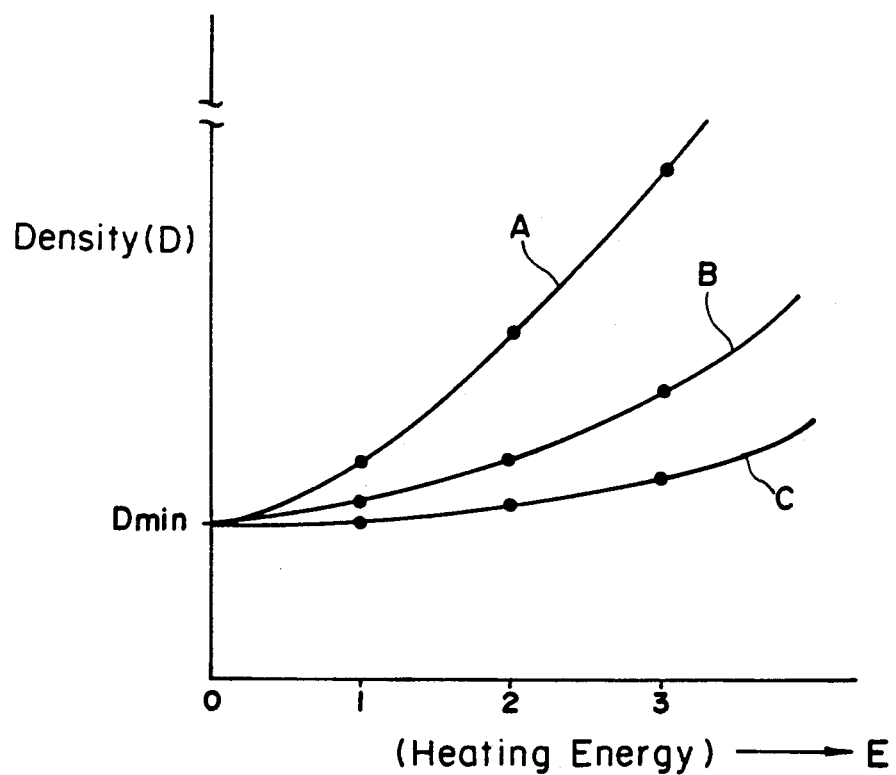

This embodiment is arranged so that, when image data are read out sequentially from the line memory 4 when commanded by a signal from the controller 7, the image data $P_{D1}$ - $P_{Dn}$ are first compared sequentially with the least data "0" of the reference gray scale data $Q_D$, and the printing data $S_{D1}$ - $S_{Dn}$ are outputted from the latch circuit 8. Subsequently, the same image data $P_{D1}$ - $P_{Dn}$ are compared with the level "1" of the reference gray scale data $Q_D$. Thereafter, the level of the reference gray scale data $Q_D$ becomes higher sequentially and, when $P_D = Q_D$ with regard to the individual image data, the printing data $S_{D1}$ - $S_{Dn}$ are turned to a low (L) level as shown in FIG. 5.

Figure 2:
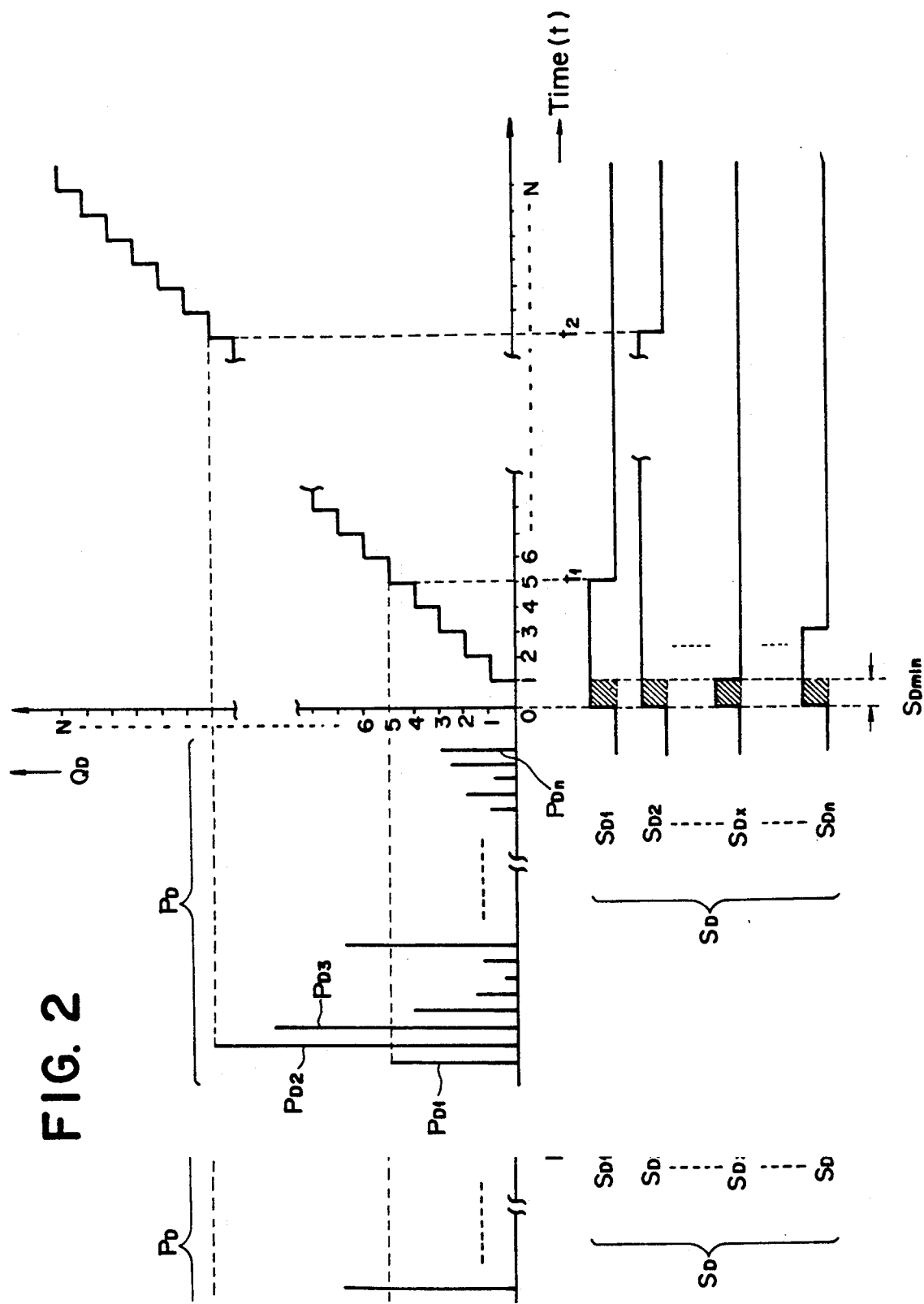
FIG. 2 graphically represents the relationship among a reference gray scale signal, the image data, and the printing data.

Therefore, similarly to the conventional example, the pulse width of the printing data $S_D$ becomes longer, thus conforming with the augment at value of the image data $P_D$ corresponding to the density. Thus, the heating energy of the thermal head is increased to raise the density as in the known gray scale signal supply system. However, according to the present invention, the image printing data "1" is added via the OR gate 11 even when $P_D = Q_D = 0$ as shown in FIG. 1, so that the printing data $S_D$ rises with the least reference gray scale data, i.e., when $Q_D = 0$, as shown by the shaded area in FIG. 2, even when $P_D = 0$ signifying that the image data of a zero density (white paper) is outputted, whereby the least printing data $S_{DMIN}$ is added as a result.

Due to such output $S_{DMIN}$, the thermosensitive paper is slightly colored even when the image data $P_D = 0$ corresponding to a white level.

Figure 3A:
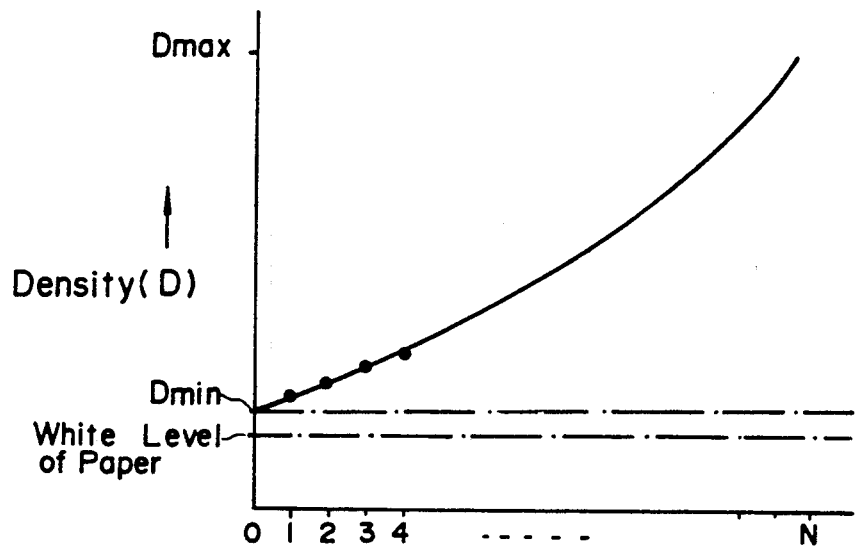
FIGS. 3(a) and 3(b) graphically represent the gray scale levels in the present invention.
Figure 3B:
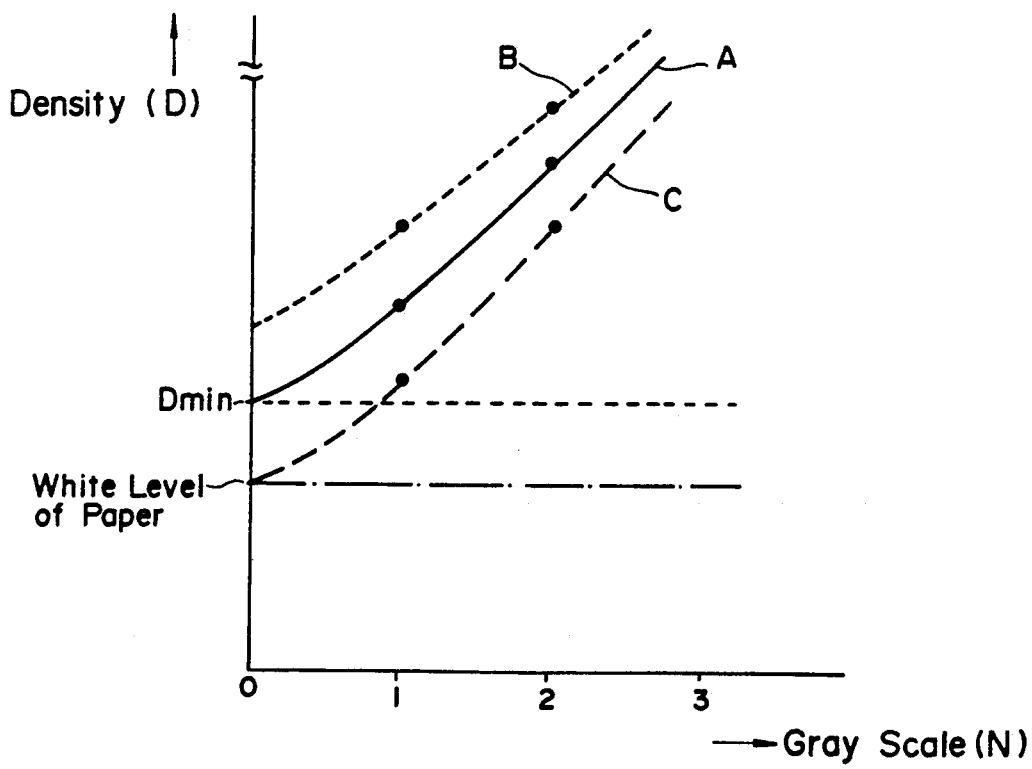

Thus, the density dynamic range of the thermal printer according to the present invention is so determined that the minimum density level $D_{min}$ becomes somewhat higher than the white level as shown in FIG. 3 (a), thereby slightly coloring the paper even when the gray scale of the image data is 0.

In FIG. 3 (b), the curve A represents the enlarged level relationship between the density D and the gray scale N in the vicinity of the area where the density becomes zero.

In the present invention where the density $D_{min}$ is so selected as to cause slight coloring even when the gray scale N of the image data is zero, neither "white deformation" nor "white saturation" is induced if the density-to-gray scale relationship is varied according to the curve B or C by any temperature fluctuation or any change in the heat storage state of the thermal head. Hence, a satisfactory expression is realized with smooth boundaries which are prone to be conspicuous between white and other-density portions in the gray scale image.

In the above embodiment, the means for slightly coloring the paper at the time of a zero density is executed by adding the magnitude comparator output to the data which thus causes $Q_D = P_D = 0$. However, the setting may be so modified that the level of the image data $P_D$ outputted from the line memory 2 is raised to be higher by one digital rank. Furthermore, it is also possible to employ some other circuit means for keeping the pulse width of the printing data $S_D$ above the minimum coloring level.

As mentioned hereinabove, according to the gray scale signal generating circuit of the present invention for a thermal printer, the minimum level of the density dynamic range is selectively set to induce slight coloring instead of being set to white. Consequently, although there occurs a small reduction in the dynamic range of the gradation, it becomes possible to eliminate "white deformation" and "white saturation" that bring about a considerable quality deterioration of the gray scale image, hence achieving the advantageous effects of smoothing the density changes in the printed image to remove any false contour to eventually enhance the gradational image quality.

What is claimed is:

1. A gray scale signal generating circuit for a thermal printer, comprising:
   memory means for storing image data to be printed;
   means for generating PWM driving pulses of said image data stored in said memory means;
   means for generating a zero level driving pulse; and
   means for supplying said PWM driving pulses and said zero level driving pulse to a thermal head drive circuit so that a print image is obtained even when said image data is at a zero level.

2. A gray scale signal generating circuit as set forth in claim 1, wherein said zero level driving pulse is added to said PWM driving pulses as a least significant PWM pulse, so that the minimum level of color is caused to appear on a printing image even when said image data is at a zero level.

3. A gray scale signal generating circuit as set forth in claim 1, wherein said PWM driving pulse supplying means includes reference gray scale generating means and magnitude comparator means, and said image data stored in said memory means are sequentially compared with reference gray scale data from said reference gray scale generating means to generate said PWM driving pulses.

4. A gray scale signal generating circuit as set forth in claim 3, wherein said zero level driving pulse generating means is provided in association with said magnitude comparator means to generate said zero level driving pulse at any time in a printing operation.

5. A gray scale signal generating circuit for a thermal printer, comprising:
   means for providing a signal representative of image data to be printed;
   means for providing a signal representative of a zero level of said image data to be printed; and
   means for supplying said signals representative respectively of said image data and said zero level of said image data to a thermal head drive circuit for a thermal head in said thermal printer, whereby a print image is obtained even when said image data is at a zero level.

6. The circuit as set forth in claim 5 wherein said means for providing a signal representative of image data to be printed comprise a memory means for storing said image data.

7. The circuit as set forth in claim 6 wherein said providing means includes a source of image signals; means for digitizing said image signals; and memory means for storing the digitized image signals.

8. The circuit as set forth in claim 5 wherein said signal representative of image data to be printed is a PWM pulse signal comprising a plurality of PWM pulses modulated in accordance with said image data.

9. The circuit as set forth in claim 5 wherein said supplying means adds said signal representative of said zero level of said image data to be printed to said PWM driving pulses as a least significant pulse, so that the minimum level of color is caused to appear on a printing image even when said image data is at a zero level.

10. The circuit as set forth in claim 5 wherein said image data and said zero level providing means include a reference gray scale generator and a magnitude comparator for comparing said image data to said reference gray scale on a sequential basis to generate PWM driving pulses.

11. The circuit as set forth in claim 10 wherein said magnitude comparator outputs a signal representative of a zero level at any time in a printing operation.

12. A method for generating a gray scale signal for a thermal printer, comprising the steps of:
   storing image data to be printed in a memory means;
   generating PWM driving pulses representative of said image data;
   generating a zero level driving pulse for said image data; and
   supplying said PWM driving pulses and said zero level driving pulse to a thermal head drive circuit of said printer so that a print image is obtained from said thermal printer even when said image data is at a zero level.

13. The method for generating a gray scale signal as set forth in claim 12, further including the step of adding said zero level driving pulse to said PWM driving pulses as a least significant PWM pulse so that the minimum level of color is caused to appear on a printing image even when said image data is at a zero level.

14. The method for generating a gray scale signal as set forth in claim 12, further including a step of sequentially comparing said image data stored in said memory means with a reference gray scale data from a reference gray scale generating means to generate said PWM driving pulses.

15. The method for generating a gray scale signal as set forth in claim 14 wherein said step of sequentially comparing provides said zero level driving pulse at any time during a printing operation.

* * * * *